(12) United States Patent
Thompson

(10) Patent No.: US 6,243,514 B1
(45) Date of Patent: Jun. 5, 2001

(54) OPTICAL MULTIPLEXER/DEMULTIPLEXER

(75) Inventor: George Horace Brooke Thompson, Sawbridgeworth (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/071,071

(22) Filed: Apr. 30, 1998

(30) Foreign Application Priority Data

Feb. 13, 1998 (GB) .................................................. 9803162

(51) Int. Cl.$^7$ ....................................................... G02B 6/34
(52) U.S. Cl. .............................. 385/37; 385/14; 385/27; 385/46
(58) Field of Search ................... 385/37, 46, 14, 385/15, 24, 129

(56) References Cited

U.S. PATENT DOCUMENTS

| 5,450,512 | 9/1995 | Asakura | 385/48 |
| 5,488,680 | * 1/1996 | Dragone | 385/24 |
| 5,745,616 | * 4/1998 | Zirngibl | 385/37 |
| 5,926,587 | * 7/1999 | Chen et al. | 385/14 |

FOREIGN PATENT DOCUMENTS

| 0254453A2 | 1/1988 | (EP) | G02B/5/18 |
| 0591042A1 | 4/1994 | (EP) | G02B/6/34 |
| 2222891A | 3/1990 | (GB) | G02B/5/18 |
| WO98/04944 | 2/1998 | (WO) | G02B/6/34 |

OTHER PUBLICATIONS

Ishida, et al., "Loss–Imbalance Equalization in Arrayed–Waveguide–Grating (AWG) Multiplexer Cascades," 8217 Journal of Lightwave Technology 13 (1995) Jun., No. 6, New York, NY US, pp. 1155–1163.

Dragone et al., "Integrated Optics N×N Multiplexer on Silicon," IEEE Photonics Technology Letters, vol. 3, No. 10, Oct. 1991, pp. 896–899.

Tsai, et al., "Multiband Wavelength–Division Demultiplexing with a Cascaded Substrate–mode Grating Structure," Applied Optics, vol. 34, No. 25, Sep. 1, 1995, pp. 5582–5588.

* cited by examiner

*Primary Examiner*—Rodney Bovernick
*Assistant Examiner*—Michael J. Stahl
(74) *Attorney, Agent, or Firm*—Lee, Mann, Smith, McWilliams, Sweeney & Ohlson

(57) ABSTRACT

An optical multiplexer/demultiplexer with an improved spectral characteristic is provided by two diffraction gratings (21, 20) arranged optically in tandem and one being configured to embrace the other, the gratings also being arranged to provide free spectral ranges differing by a factor of at least two, and having a coupling (22') between them that carries over into the second grating information concerning the dispersion afforded by the first grating.

4 Claims, 4 Drawing Sheets

OPTICAL MULTIPLEXER/DEMULTIPLEXER

BACKGROUND TO THE INVENTION

Optical Wavelength Division Multiplexed (WDM) systems ideally require passive optical wavelength multiplexers and demultiplexers which have isolated pass-bands which are flat-topped so as to allow a measure of tolerance in the spectral positioning of the individual signals of the WDM system within these pass-bands. One method of multiplexing or demultiplexing channels in an optical WDM system relies upon the use of multilayer dielectric interference filters. Another relies upon Bragg reflection effects created in optical fibres. A third method, the method with which the present invention is particularly concerned, relies upon diffraction grating effects.

One form that such a diffraction grating can take for wavelength multiplexing/demultiplexing is the form described in EP 0 254 453, which also refers, with particular reference to its FIG. 5, to the possibility of having a tandem arrangement of two diffraction gratings arranged to provide a combined intensity transfer function that is the product of the intensity transfer function of its component diffraction grating 40 with that of its component diffraction grating 42.

An alternative form that such a diffraction grating can take is an optical waveguide grating that includes a set of optical waveguides in side-by-side array, each extending from one end of the array to the other, and being of uniformly incrementally greater optical path length from the shortest at one side of the array to the longest at the other. Such an optical grating constitutes a component of the multiplexer described by C Dragone et al., 'Integrated Optics N×N Multiplexer on Silicon', IEEE Photonics Technology Letters, Vol. 3, No. 10, Oct. 1991, pages 896–9. Referring to FIG. 1, the basic components of a 4-port version of such a multiplexer comprise an optical waveguide grating, indicated generally at 10, where two ends are optically coupled by radiative stars, indicated schematically at 11 and 12, respectively with input and output sets of waveguides 13 and 14. Monochromatic light launched into one of the waveguides of set 13 spreads out in radiative star 11 to illuminate the input ends of all the waveguides of the grating 10. At the far end of the grating 10 the field components of the emergent light interfere coherently in the far-field to produce a single bright spot at the far side of the radiative star 12. Scanning the wavelength of the light causes a slip in the phase relationship of these field components, with the result that the bright spot traverses the inboard ends of the output set of waveguides 14 linearly with wavelengths as depicted at 15. If the mode size of the waveguides 14 is well matched with the size of the bright spot, then efficient coupling occurs at each of the wavelengths at which the bright spot precisely registers with one of those waveguides 14. Either side of these specific wavelengths the power falls off in a typically Gaussian manner as depicted at 15. While this may allow acceptable extinction to be achieved between channels, it is far from the ideal of a flat-topped response.

A tandem arrangement of this alternative form of diffraction grating can also be constructed, an example of such an arrangement being described in EP 0 591 042 with particular reference to its FIG. 3. This tandem arrangement similarly provides a combined intensity transfer function that is the product of the intensity transfer functions of its two component diffraction gratings. The response of this tandem arrangement also provides a typically Gaussian fall off in power that is similarly far from the ideal of a flat-topped response.

SUMMARY OF THE INVENTION

The present invention is directed to the provision of an optical multiplexer/demultiplexer that achieves a response that is more nearly flat-topped without introducing excessive insertion loss. In particular, it is directed to an improvement of the type of multiplexer/demultiplexer described in the specification of PCT Application GB 97/02051 corresponding to U.S. Pat. application No. 09/194,004, now U.S. Pat. No. 6,144,783, with particular reference to its FIG. 6, to which specification attention is specifically directed and its teachings incorporated herein by reference.

One of the features limiting the performance of such a multiplexer/demultiplexer is departures from uniformity within the area of the wafer from which the device is constructed, particularly departures from uniformity in the thickness and composition of the layers defining the optical waveguides.

An object of the present invention is to reduce the effects of such departures upon the performance so as to enable higher performance multiplexer/demultiplexer devices to be constructed from a given standard of wafer uniformity.

According to the present invention there is provided an optical multiplexer/demultiplexer for the multiplexing/demultiplexing of optical signal channels at a substantially uniform optical frequency spacing, which multiplexer/demultiplexer includes a set of input/output ports optically coupled with an output/input port via a tandem arrangement of first and second optical waveguide diffraction gratings that provide multiple optical paths from each member of the set of input-output ports to the output/input port via different grating elements of the gratings, wherein the difference in optical path length occasioned by paths via adjacent optical waveguide elements of the first grating is greater than that occasioned by paths via adjacent optical waveguide elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as the sum formed by the addition of the difference in frequency between adjacent frequency channels of the multiplexer/demultiplexer to the difference in frequency between the highest and lowest frequency channels of the multiplexer/demultiplexer, wherein the portion of the optical coupling between the set of input/output ports and the output/input port that extends between the first and second diffraction gratings couples spatial information between the two gratings in addition to intensity information, wherein the optical waveguide elements of each diffraction grating consist of a plurality of optical waveguides extending in side-by-side relationship in a set of arcuate optical paths and wherein the arcuate optical paths of the optical waveguides of one of said first and second diffraction gratings is configured to embrace the set of arcuate paths of the optical waveguides of the other of said first and second gratings.

Other features and advantages of the invention will be readily apparent from the following description of preferred embodiments of the invention, the drawings and the claims.

DETAILED DESCRIPTION OF THE PREFERRED EMBODIMENT

Figure 1:
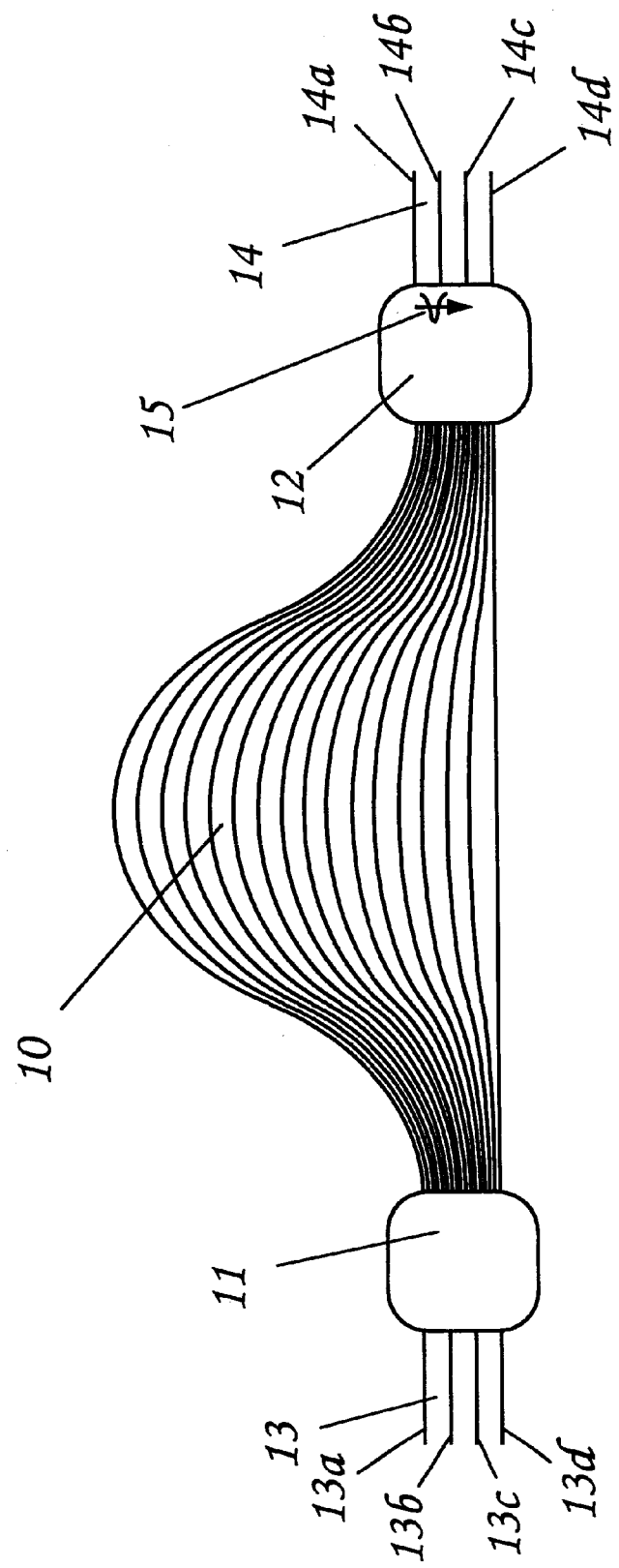
FIG. 1 (to which previous reference has already been made) schematically depicts a prior art optical multiplexer/demultiplexer employing an optical waveguide type diffraction grating.
Figure 2:
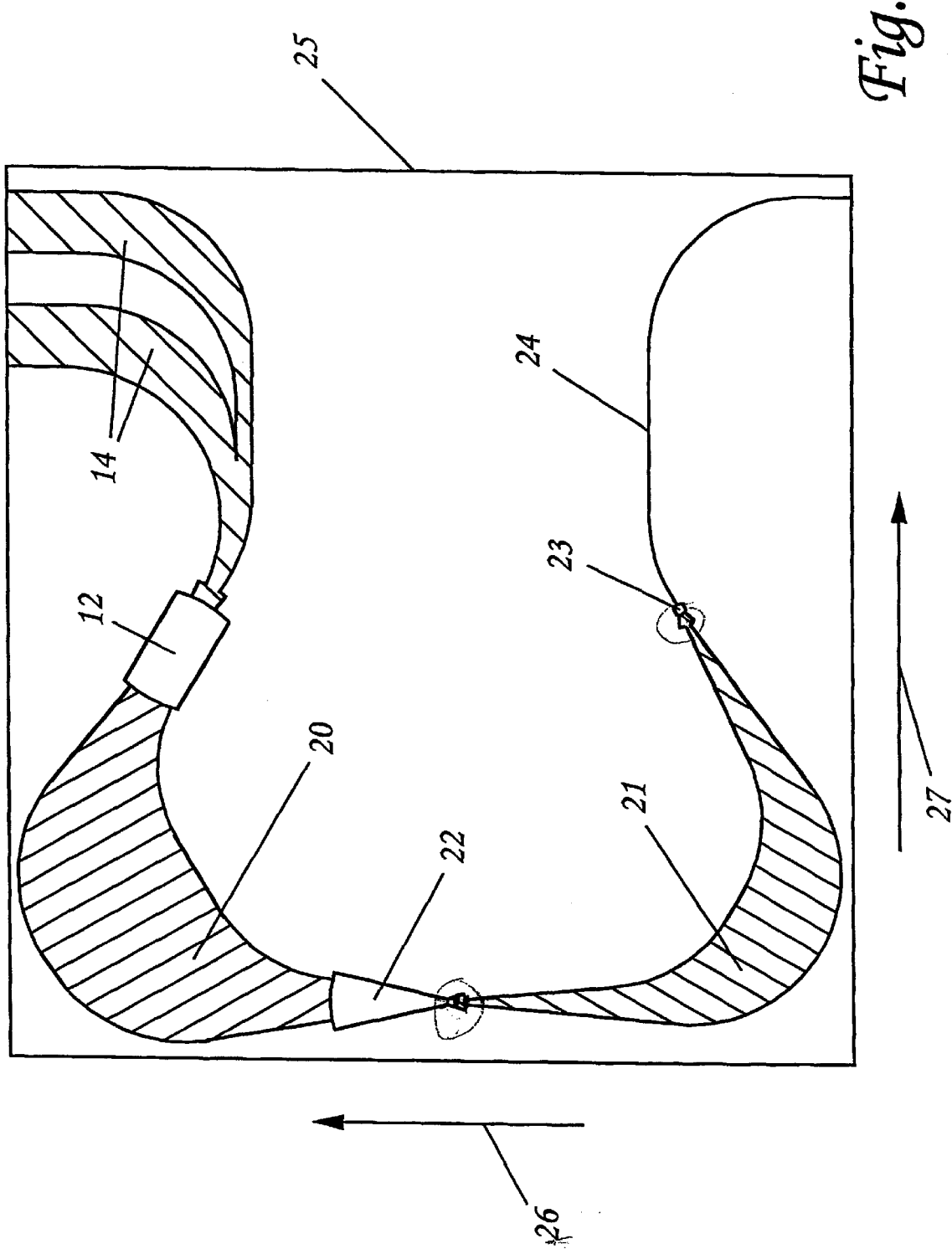
FIG. 2 is a schematic diagram of the configuration of a practical implementation of a multiplexer/demultiplexer constructed in accordance with the teachings of the specification of PCT GB 97/02051.

Whereas FIG. 6 of the specification of PCT GB 97/02051 (to which previous reference has already been made) shows a schematic diagram of a multiplexer/demultiplexer device with an in-line tandem arrangement of its two component optical waveguide diffraction gratings, a practical implementation may typically have a configuration more nearly like that depicted in FIG. 2 of this specification in which the waveguides of the gratings are arranged in a manner that is liable to be less prodigal with usage of integrated optics wafer area. In this arrangement of FIG. 2 the two optical waveguide diffraction gratings are depicted respectively at 20 and 21 on an integrated optics wafer 25, these gratings exhibiting FSRs that differ in magnitude by a factor at least equal to the number of channels being separated. Grating 20 corresponds to grating 10 of FIG. 1 and, under the assumption that the left-hand side of the diagram of FIG. 1 is the input side, the output side to this grating is unchanged, comprising a coupling region 12 feeding a set of waveguides 14. In this particular instance the outboard ends of the waveguides 14 have been arranged into two groups for facilitating the coupling of those ends with the ends of two optical fibre ribbons (not shown). On the input side of grating 20, the radiative star coupling 11 is replaced by a coupling region 22 which provides optical coupling between grating 20 and grating 21. On the input side of grating 21 is a further optical coupling region 23 which, optically couples a single waveguide 24 with the input end of the input of grating 21. Each of these coupling regions functions as a device performing a Fourier Transform converting positional information into angular information, or vice versa. The coupling region 22 is in effect a tandem arrangement of two conventional type radiative stars arranged back-to-back and meeting in an 'image plane'. The first radiative star component of coupling region 22 operates to convert angular information received from one of the gratings into positional information at the 'image plane', while the second converts it back into angular information again for launching into the other grating. Thus it is seen that this coupling region 22 couples both intensity and spatial information between the two gratings. (The two component radiative stars of coupling region 22 may normally be designed to meet in an 'image plane' that is indeed a planar surface, but for certain geometries it may be preferred for this surface to have a curvature.)

A multiplexer/demultiplexer of the type of configuration illustrated in FIG. 2 of this specification, and designed for operation in a WDM environment with a 200 GHz channel spacing, may typically occupy a silica-on-silica wafer area of about 30 mm by 30 mm. For satisfactory operation the two optical waveguide diffraction gratings 20 and 21 typically need to register to at least one tenth, and preferably to one fifteenth of a channel separation, or better; i.e. a tolerance of about ± 0.1 nm or better is called for. One of the limiting factors in achieving such tighter tolerances is control over the thickness and composition of the layers of wafer 25 that go to make up its optical waveguiding structure. Inspection of FIG. 2 of this specification reveals that in the case of a compositional or thickness gradient with a component extending in the direction of arrow 26, that component is likely to be more troublesome than a component of equal magnitude extending in the direction of arrow 27. This is because in the case of the component of the gradient extending in the direction of arrow 27, the effects it produces in diffraction grating 20 are at least partially offset by those it produces in diffraction grating 21. Using current wafer processing technology it has been found that these tolerance requirements impose at least somewhat of a yield problem so far as the provision of suitable wafers is concerned, and that this yield problem is liable to be significantly greater when attempting the construction of multiplexer/demultiplexer devices for operation in a WDM environment with a 100 GHz channel spacing.

Figure 3:
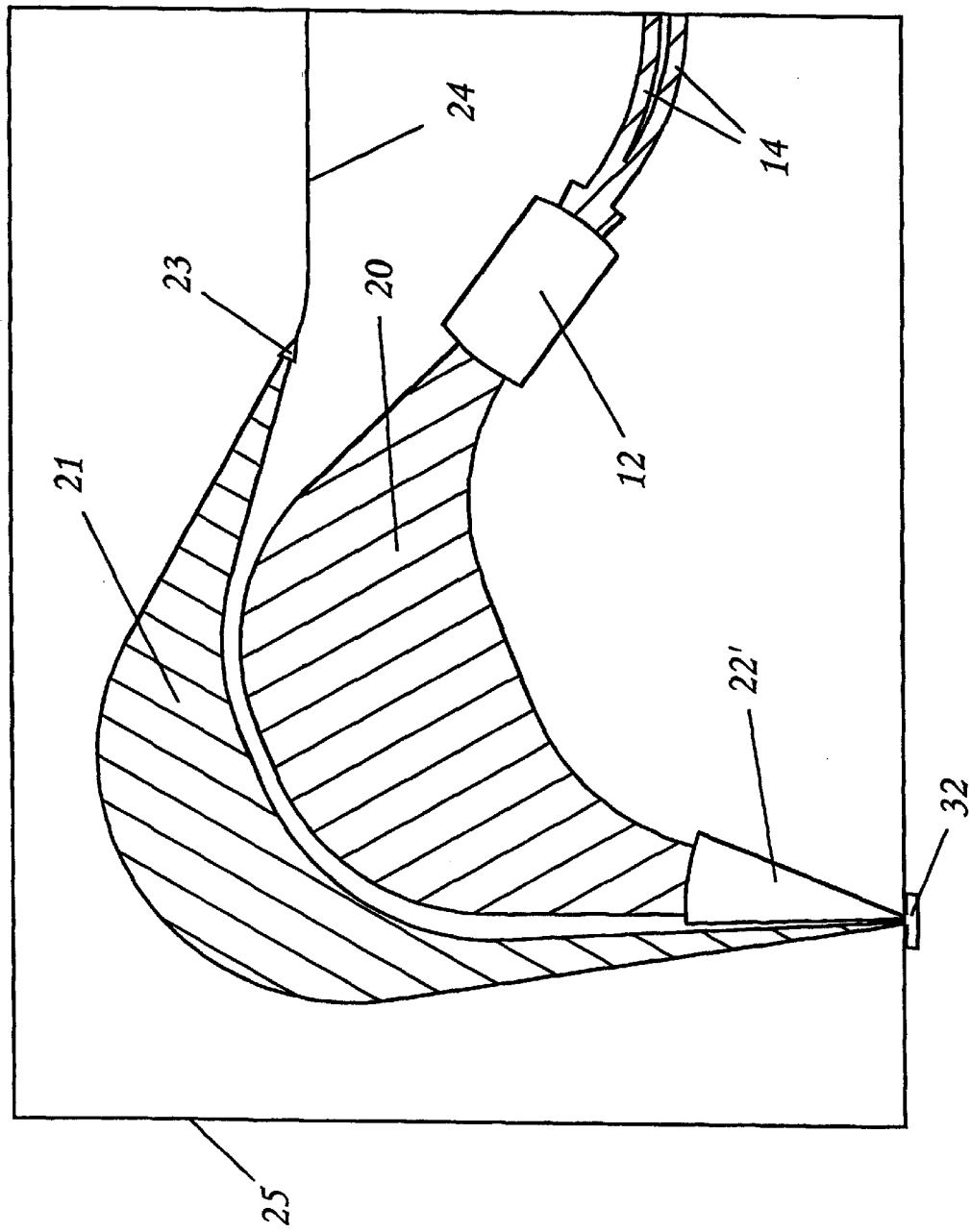
FIG. 3 is a schematic diagram of a configuration of a multiplexer/demultiplexer constructed in accordance with the teachings of the present invention.

Attention is now turned to FIG. 3 of this specification which depicts a configuration of multiplexer/demultiplexer embodying the present invention in a preferred form. Most of its components have their counterparts in the multiplexer/demultiplexer of FIG. 2 of this specification, and these components have been identified with the same index numerals as those FIG. 2 counterparts. Thus the device of FIG. 3 similarly has an arrangement of two optical waveguide diffraction gratings optically in tandem. These gratings are optically coupled by means of a coupling region 22', that is very similar to the coupling region 22 of FIG. 2, but additionally contains a reflector 32 to provide an optical path that is folded back almost upon itself. Light that is launched into the device by way of the single waveguide 24 is coupled by coupling region 23 into grating 21. The coupling region 22', with its reflector 32, then couples this light into grating 20, from where it is coupled by coupling region 12 into the waveguides 14.

Figure 4:
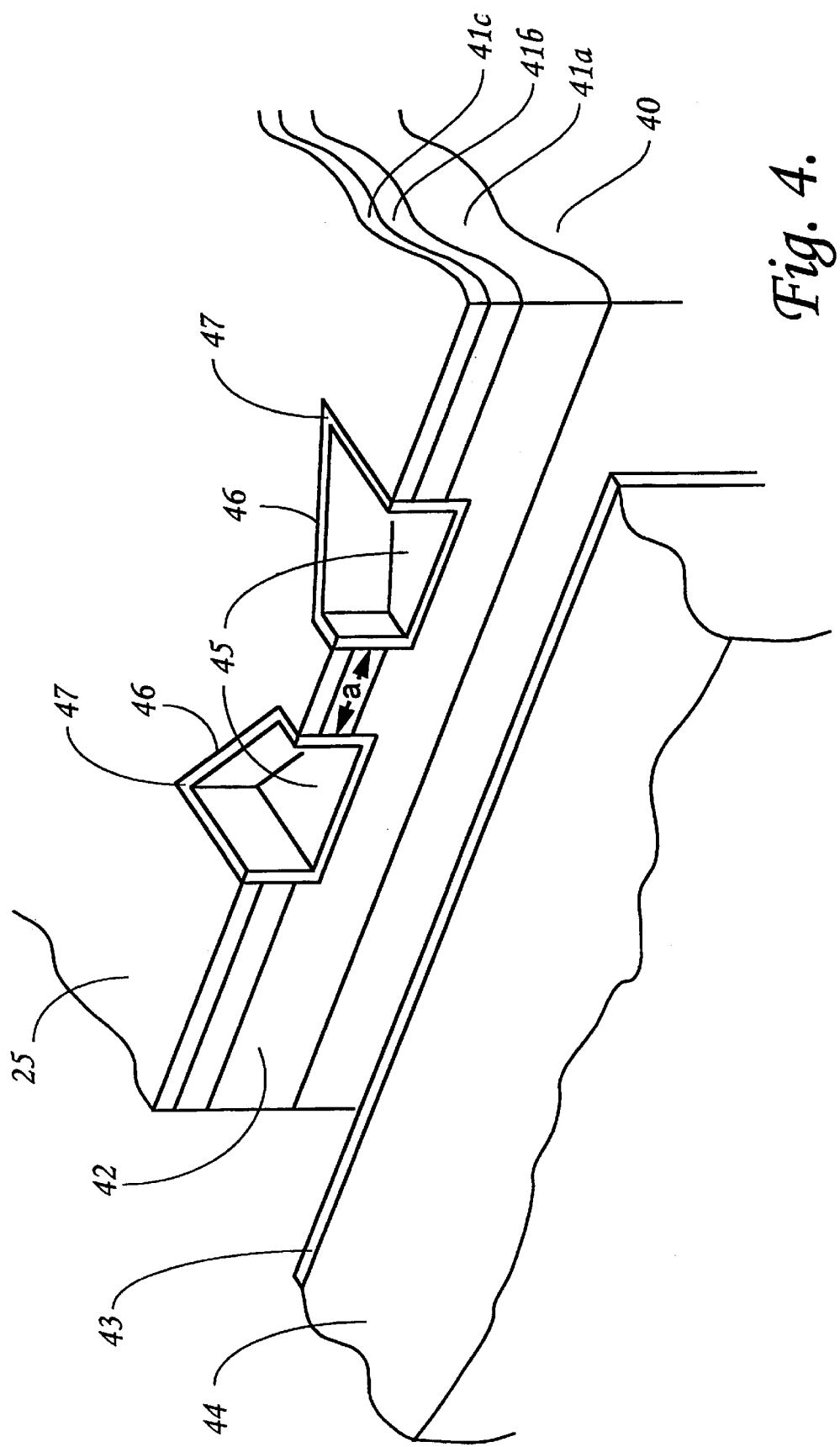
FIG. 4 is a schematic perspective view of a portion of the multiplexer/demultiplexer of FIG. 3.

In relation to its multiplexer/demultiplexer of its FIG. 6, the specification of PCT Application GB 97/02051 explains that, at least in certain configurations, it is desirable to include some form of field stop to block light of unwanted diffracted orders from being coupled between the two optical waveguide diffraction gratings, and in relation to its multiplexer/demultiplexer of FIG. 7 explains that the function of that field stop could be performed by the appropriate dimensioning of the reflector that couples the two optical waveguide diffraction gratings of the device. This also applies to multiplexer/demultiplexers of the present invention. FIG. 4 of this specification depicts in greater detail one manner in which this may be accomplished.

FIG. 4 depicts a schematic perspective view of that portion of the multiplexer/demultiplexer of FIG. 3 that contains its reflector 32, and shows the basic layer structure of the integrated optics wafer 25, which consists of a silicon substrate 40 upon which has been formed three glassy layers 41a to 41c. Layer 41a is a buffer layer of silica. Layer 41b is a core-glass layer of doped silica having a refractive index greater than that of the buffer layer 41a. Layer 41c is a cladding-glass layer, typically also a layer of doped silica, but doped in a manner providing a lower refractive index than that of the core-glass layer 41b, and typically doped so as to make its refractive index substantially matched with that of the silica buffer layer 41a.

In principle, where the coupling region 22' meets the edge of the wafer in face 42, what is wanted for a field stop is for that face to be specularly reflective only over a certain specific width 'a'. Beyond the confines of width 'a' there should preferably be substantially no specular reflection. Specular reflection outside the confines of width 'a' is however acceptable provided that its specular reflection plane is aligned at a sufficiently large angle with respect to the reflection plane within the confines of width 'a' for that specularly reflected light (outside the confines of width 'a') to be deviated enough to fail to couple into either of the optical waveguide diffraction gratings 20 and 21.

Instead of attempting to provide a high quality specularly reflecting surface at face 42 itself, it is preferred for this reflecting surface to be provided by metallisation 43 deposited upon a cleaved surface of a crystal chip 44 which is subsequently cemented with an index-matching adhesive (not shown) to face 42. By this means, a face 42 prepared by sawing the wafer can be of acceptable quality.

In principle, the field stop can be provided on chip 44 either by masking off all but a width 'a' central stripe of the metallisation 43 with non-reflective material, or by confining the metallisation to a stripe of width 'a' flanked by regions of non-reflective material. Having regard, however, to the fact that width 'a' is typically only a few $\mu$m wide, it is preferred to avoid the registration problems involved in bonding such a chip to wafer 25 by instead creating the field stop in the wafer 25 itself. To this end, two wells 45 are etched through cladding- and core-glass layers 41c and 41b, and into buffer layer 41a before the wafer is sawn to produce the face 42. These wells have side-walls 46 that are aligned at a sufficiently large angle with respect to face 42 for any light specularly reflected by these side-walls to be deviated enough to fail to couple into either of the optical waveguide diffraction gratings 20 and 21. A light-absorbing or light-reflecting coating 47 is applied to the interiors of the wells 45 so that the side-walls 46 cannot be contacted by the index-matching adhesive subsequently used to secure chip 44 in position on face 42.

What is claimed is:

1. An optical multiplexer/demultiplexer for the multiplexing/demultiplexing of optical signal channels at a substantially uniform optical frequency spacing, which multiplexer/demultiplexer includes, in an integrated waveguide optics structure, a set of input/output ports optically coupled with an output/input port via a tandem arrangement of first and second optical waveguide diffraction gratings that provide multiple optical waveguide paths from each member of the set of input-output ports to the output/input port via different grating elements of the gratings, wherein the difference in optical path length occasioned by paths via adjacent optical waveguide elements of the first grating is greater than that occasioned by paths via adjacent optical waveguide elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as the sum formed by the addition of the difference in frequency between adjacent frequency channels of the multiplexer/demultiplexer to the difference in frequency between the highest and lowest frequency channels of the multiplexer/demultiplexer, wherein the portion of the optical coupling between the set of input/output ports and the output/input port that extends between the first and second diffraction gratings comprises a reflecting surface opposite ends of the two gratings, which ends are adjacent, and couples spatial information between the two gratings in addition to intensity information, wherein the optical waveguide elements of each diffraction grating consist of a plurality of optical waveguides extending in side-by-side relationship in a set of arcuate optical paths, and wherein the arcuate optical oaths of the optical waveguides of one of said first and second diffraction gratings is configured to embrace the set of arcuate paths of the optical waveguides of the other of said first and second gratings.

2. A wavelength division multiplexed optical transmission system including at least one multiplexer as claimed in claim 1.

3. A wavelength division multiplexed optical transmission system including at least one demultiplexer as claimed in claim 1.

4. A passive wavelength cross-connect including a set of optical multiplexer/demultiplexers as claimed in claim 1, wherein the second diffraction grating of each multiplexer/demultiplexer of the set is common to all multiplexer/demultiplexers of the set.

* * * * *